(12) United States Patent
Moyer

(10) Patent No.: US 9,244,653 B2
(45) Date of Patent: *Jan. 26, 2016

(54) METHOD AND DEVICE FOR HANDLING DATA VALUES

(71) Applicant: William C. Moyer, Dripping Springs, TX (US)

(72) Inventor: William C. Moyer, Dripping Springs, TX (US)

(73) Assignee: FREESCALE SEMICONDUCTOR, INC., Austin, TX (US)

( * ) Notice: Subject to any disclaimer, the term of this patent is extended or adjusted under 35 U.S.C. 154(b) by 361 days.

This patent is subject to a terminal disclaimer.

(21) Appl. No.: 13/841,242

(22) Filed: Mar. 15, 2013

(65) Prior Publication Data

US 2014/0280424 A1 Sep. 18, 2014

(51) Int. Cl.
*G06F 7/38* (2006.01)
*G06F 7/483* (2006.01)

(52) U.S. Cl.
CPC ...................................... *G06F 7/483* (2013.01)

(58) Field of Classification Search
CPC ....................................................... G06F 7/483
USPC ........................................................ 708/495
See application file for complete search history.

(56) References Cited

U.S. PATENT DOCUMENTS

| | | | |
|---|---|---|---|
| 5,481,489 A | 1/1996 | Yanagida et al. | |
| 5,748,516 A | 5/1998 | Goddard et al. | |
| 5,931,943 A | 8/1999 | Orup | |
| 6,009,511 A | 12/1999 | Lynch et al. | |
| 6,138,135 A | 10/2000 | Karp | |
| 6,170,001 B1 | 1/2001 | Hinds et al. | |
| 6,519,694 B2 | 2/2003 | Harris | |
| 6,560,623 B1 * | 5/2003 | Smith | 708/551 |
| 6,976,050 B2 | 12/2005 | Steele, Jr. | |
| 7,069,288 B2 | 6/2006 | Steele, Jr. | |
| 7,133,890 B2 | 11/2006 | Steele, Jr. | |
| 7,191,202 B2 | 3/2007 | Steele, Jr. | |
| 7,228,324 B2 | 6/2007 | Steele, Jr. | |
| 2010/0217579 A1 | 8/2010 | Li et al. | |

OTHER PUBLICATIONS

U.S. Appl. No. 14/040,795, filed Sep. 30, 2013, entitled "Method and Device for Generating Floating-Point Values".
Non-Final Office Action mailed Apr. 28, 2015 for U.S. Appl. No. 13/841,630, 16 pages.
Non-Final Office Action mailed Jun. 15, 2015 for U.S. Appl. No. 14/040,795, 6 pages.
Notice of Allowance mailed Sep. 23, 2015 for U.S. Appl. No. 14/040,795, 7 pages.
Final Office Action mailed Aug. 17, 2015 for U.S. Appl. No. 13/841,630, 5 pages.
US 5,987,901, 11/1999, Luedtke et al. (withdrawn)

* cited by examiner

*Primary Examiner* — Tan V. Mai

(57) ABSTRACT

A floating point value can represent a number or something that is not a number (NaN). A floating point value that is a NaN having data field that stores information, such as a propagation count that indicates the number of times a NaN value has been propagated through instructions. A NaN evaluation instruction can determine whether one or more operands is a NaN operand of a particular type, and if so can generate a result that is a NaN of a different type. An exception can be generated based upon the NaN of the different type being provided as a resultant.

20 Claims, 4 Drawing Sheets

US 9,244,653 B2

METHOD AND DEVICE FOR HANDLING DATA VALUES

CROSS-REFERENCE TO RELATED APPLICATION(S)

The present application is related to co-pending U.S. patent application Ser. No. 13/841,630, entitled "METHOD AND DEVICE FOR GENERATING AN EXCEPTION" filed on Mar. 15, 2013, the entirety of which is herein incorporated by reference.

BACKGROUND

1. Field of the Disclosure

The present disclosure relates to electronic devices, and more specifically to data processing devices having floating-point processing capabilities.

2. Description of the Related Art

Data processing devices may use integer numbers or floating-point numbers to carry out computations. Floating-point numbers are use for calculations involving very large or very small numbers. Floating-point numbers are typically represented within a data processing device by an exponent and mantissa, or significand. Various formats for representing numbers within a data processing device are possible, and in particular for representing floating point numbers. IEEE 754 is a standard that specifies a family of related floating-point formats. Formats, including IEEE 754, allow for values to be stored that represent something other than a floating-point number in response to conditions that can arise during a floating-point calculation. For example, the result of dividing zero by zero is not a number in the normal sense. Thus, a floating-point format can specify a particular manner to store information that by definition represents a floating-point result that is not a number. In accordance with a floating-point format, a value that represents something other than a number, e.g., not a number can be referred to a "NaN", or a "NaN value".

NaN values may participate as input operands to floating-point instructions in some data processing systems. Such floating-point instructions, in response to receiving a NaN as an operand, will produce a resultant that is also a NaN value. A resultant or operand having a NaN value can be referred to as "resultant/operand that is a NaN", or as "NaN resultant/operand".

BRIEF DESCRIPTION OF THE DRAWINGS

The present disclosure may be better understood, and its numerous features and advantages made apparent to those skilled in the art by referencing the accompanying drawings.

The use of the same reference symbols in different drawings indicates similar or identical items.

DETAILED DESCRIPTION OF THE DRAWINGS

A particular format for representing floating point values supports the concept of NaN values that represent something other than a number. For example, a divide operation can result in a floating point value that is a NaN in response to dividing the number zero by the number zero (0/0). When a floating point NaN is an operand in another arithmetic operation, the resultant is typically a NaN. According to a particular embodiment of the present disclosure, a floating point format is used that can include a data value field that stores a NaN propagation count that is incremented each time a NaN resultant is provided based upon a NaN operand. Thus, a NaN resultant can provide an indicator as to a particular instruction that first generated the NaN value.

A NaN evaluation instruction is also disclosed herein that causes an exception to occur in response to having a NaN operand. This allows floating point code that generates NaNs to proceed without the overhead of checking every resultant for a NaN value, and handling every occurrence by an exception.

In accordance with a floating-point format, the term "floating-point number" (FPN), and its variants, as used herein is intended to refer to an actual floating-point number. The term "NaN", and its variants, as used herein is intended to refer to something that is not a floating-point number. The term "floating-point value" as used herein is intended to refer to a value stored according to a particular floating-point format that can be either a floating-point number or a floating-point NaN.

Figure 1:
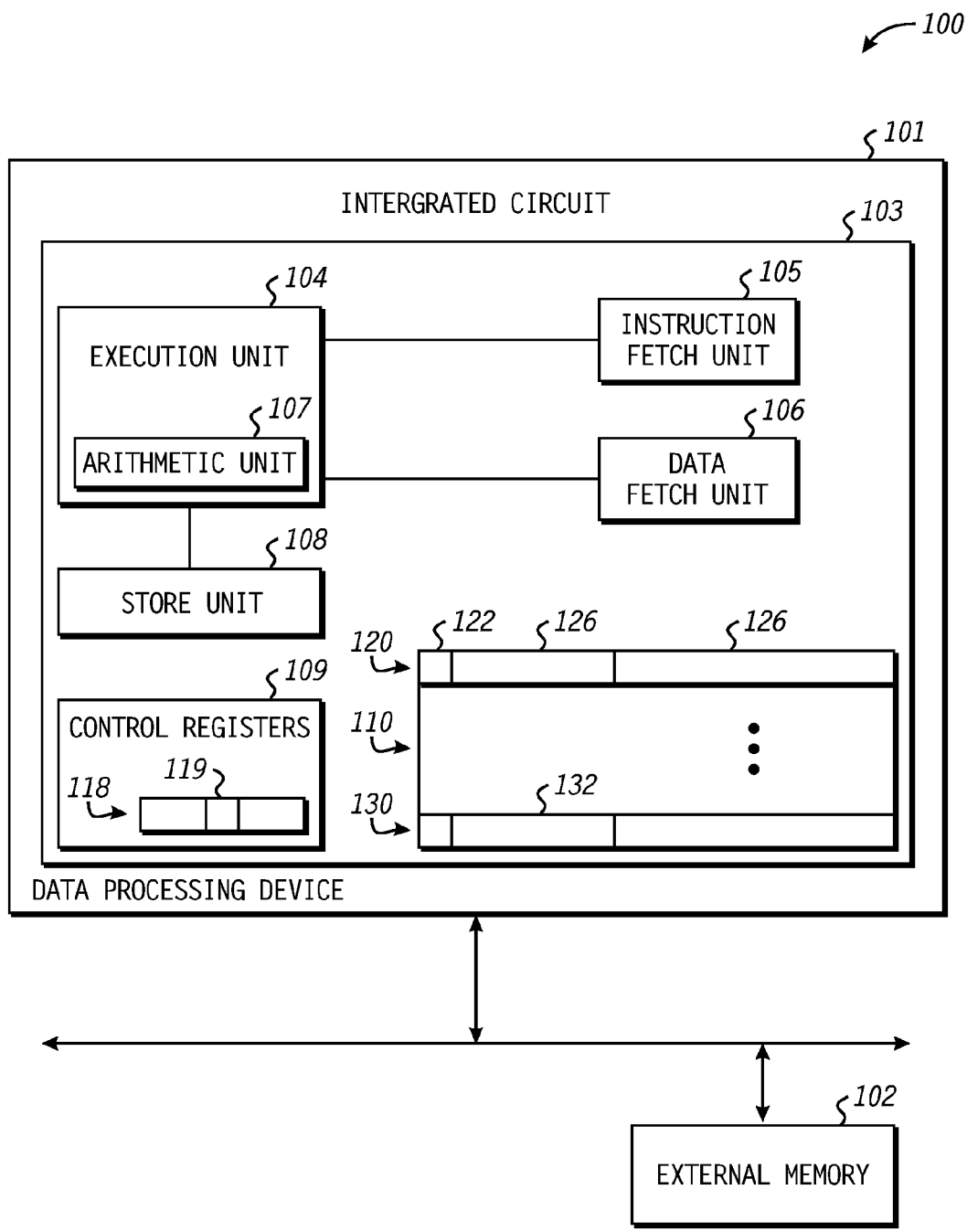
FIG. 1 is a diagram of a data processing device utilizing conditional floating-point signaling NaN generation in accordance with at least one embodiment of the present disclosure.

FIG. 1 illustrates a system device (system 100) that can handle floating-point values in accordance with at least one embodiment of the present disclosure. System 100 includes an integrated circuit 101 that can be connected to various external resources, such as external memory 102. Integrated circuit 101 can be an integrated circuit die, a packaged device that can include one or more integrated circuit die, a printed circuit board that can include one or more packaged devices and integrated circuit die, the like, and combinations thereof.

In the depicted example, the integrated circuit 101 includes a data processor device 103, such as a data processor core, that includes an execution unit 104 connected to an instruction fetch unit 105, to a data fetch unit 106, to a store unit 108, to control registers 109 (connection not shown), and to a storage location 110 (connection not shown), that is presumed to be a data register set.

During operation, the instruction fetch unit 105 fetches instructions needed by execution unit 104 from various memory locations that can include external memory 102, cache (not illustrated), and the like. During execution of a fetched instruction, the execution unit 104 will determine the location of operands needed by the instruction being executed, and provide the location information, such as an address, to data fetch unit 106. In response, data fetch unit 106 retrieves the requested operand from various locations that can include one or more of memory, register set 110, cache (not illustrated) and the like. Execution unit 104 performs arithmetic operations during execution of an instruction using arithmetic unit 107. When an instruction is retired, one or more resultants are provided to store unit 108, which stores information at appropriate locations that can include one or more of memory, data registers 110, cache (not illustrated) and the like.

Execution unit 104 can process floating-point instructions having one or more floating-point operands. For purposes of discussion, it is presumed that each operand of a particular floating-point instruction is identified by information that resides at a distinct location of the floating-point instruction. For example, a floating-point instruction having two operands, such as a divide instruction, will have a first field at a first location, that indicates where a dividend stored, and a second field of the second location, that indicates where the divisor stored.

Register set 110 in FIG. 1 contains one or more floating-point registers, including registers 120 and 130 that store floating-point values of a particular floating-point format. Register 120 is presumed to currently store a floating-point number, and is therefore illustrated to have a particular partitioning, as would be defined by a particular floating-point format, that is used to represent a floating-point number. In particular, a floating-point number is represented by information stored at various locations as indicated by fields 122, 124, and 126 of FIG. 1, which include a sign field 122, an exponent field 124, and a mantissa field 126. Mantissa field 126 may also be referred to as a significand field.

Sign field 122, exponent field 124 and mantissa field 126 each occupy a number of bits defined in a floating-point format. In the present example, with the registers in register set 110 being 32 bits wide in total, a floating-point format may specify sign field 122 to be one bit wide, exponent field 124 to be eight bits wide, and mantissa field 126 to be 23 bits wide. For convenience of description, the information stored at the various fields and registers disclosed herein can be referred to using the same reference numerals as a corresponding field or register. Thus, it would be proper to state herein that a sign bit, or a sign bit 122, can be stored at sign field 122. Those skilled in the art will appreciate that a variety of floating-point formats are possible and that embodiments of the present disclosure may not depend on the details of a particular number format. Further, a single data processing device may implement more than one format for floating-point numbers in conjunction with embodiments of the present disclosure.

As illustrated register 130 currently stores a NaN, and is therefore illustrated to indicate a particular partitioning for the given floating format that is used to represent a NaN. In particular, one or more a specific values, referred to as NaN indicator(s) 132, occupy one or more bit locations that can include sign bit 122, exponent 124 and mantissa 126 in register 120. In some embodiments, the bits in NaN indicator 132 may have specific values that indicate a register stores a NaN value. In other embodiments, the set of bits may have predefined characteristics that indicate a NaN value. For example, in an embodiment a NaN value may be indicated by a series of 8 consecutive bits with a value of '1' followed by at least one bit with a value of '1' in the remaining bits of NaN indicator 132.

Figure 2:
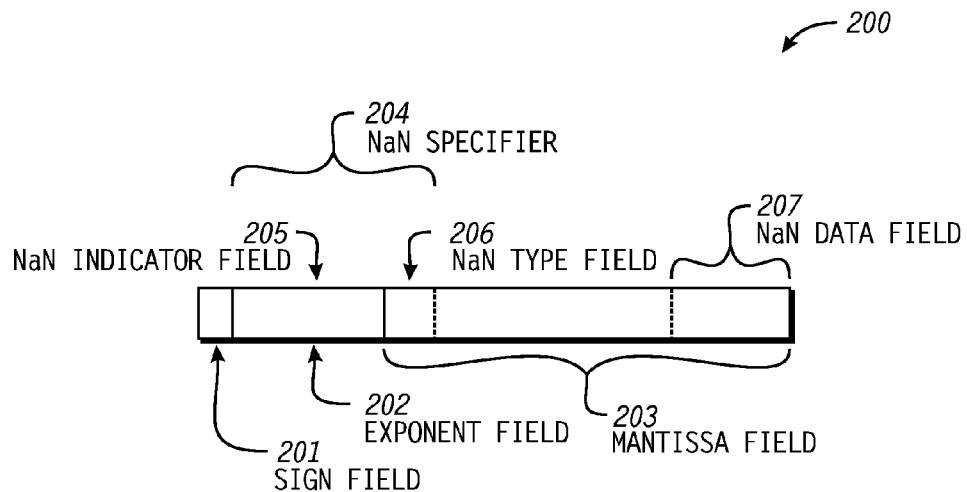
FIG. 2 is a diagram of a floating-point format in accordance with at least one embodiment of the present disclosure.

FIG. 2 illustrates one example of a partition 200 of a floating-point value for a particular floating-point format that can having floating-point values that represent either floating-point numbers (FPNs) or NaNs according to one format. In particular, values representing floating-point numbers are associated with a sign field 201, an exponent field 202, and a mantissa field 203. Values representing NaNs are associated with a NaN indicator field 205, a NaN type field 206, and a NaN data field 207. The NaN indicator field and the NaN type field collectively form a field referred to herein as a NaN specifier field 204. A NaN data value provided at the NaN data field 207 can be used to provide various other types of information with a NaN. In an embodiment, the NaN data value is a count value that indicates the number of times a particular NaN has been propagated through a sequence of floating-point computations, and therefore the NaN Data field can also be referred to herein as a NaN count field, or a count field. Note that not all bits of the NaN value need to be associated with a particular field.

In the illustrated embodiment, exponent field 202 and NaN indicator field 205 comprise the same bit positions within floating-point partition 200. According to a particular format, the value '11111111' in Exponent field 202/NaN indicator field 205 indicates that a floating-point value is a NaN, while other values of Exponent field 202/NaN indicator field 205 indicate that a floating-point value is a number. A floating-point value that includes a NaN indicator/exponent field with the value '11111111' may be referred to herein as a NaN value. For convenience, a value of NaN data field 207 may be referred to as a data value, a NaN data value, a count, a count value, and the like.

According to a particular embodiment, the NaN Type field 206 can specify one of a plurality of types of NaN values. One type of NaN value, referred to as a signaling NaN, causes an exception condition when provided as the resultant of an instruction. For example, a signaling NaN resultant can cause a floating-point invalid operation exception or an exception specific to generation of the signaling NaN. An exception caused by a signaling NaN is referred to herein as a signaling NaN exception. By way of example, the value '100' in NaN Type field 206 indicates the NaN is a signaling NaN or "sNaN" that causes a sNaN exception. According to one embodiment, generation of sNaN exceptions can be enabled and disabled from occurring when a sNaN is generated during certain operating modes. For example, a control bit of control register 109 can be asserted to enable generation of sNaN exceptions, and can be negated to disable generation of sNaN exceptions. According to another embodiment, sNaN exceptions caused by the first type of instruction cannot be disabled.

Another type of NaN value referred to as a quiet NaN, or a qNaN, does not cause an exception condition upon being generated as a resultant of an instruction, at least in some operating modes. For example, the value '010' in NaN Type field 206 indicates that a NaN value is quiet NaN.

Bits not specifically designated as being part of a field when the floating-point value is a NaN can be defined to have a particular value by the particular floating-point format or can be undefined. For example, it will be a particular format could define all of the fields illustrated at FIG. 2 except for the NaN Data field. However, because the location where the NaN Data field 207 resides is undefined by the particular format, a user can implement a different format, that is an extension of the main format, in which the NaN data field is defined.

It will be appreciated that the specific sizes and values for bit fields as used herein are used for purposes of discussion. Other field sizes and values may be used in embodiments of the present disclosure. A particular type of NaN value may be indicated by more than one value of NaN specifier 204. Further, a data processing device may use more than one format for floating-point values in conjunction with embodiments of the present disclosure.

Referring back to FIG. 1, control register 118 of the data processing device 103 can include a control register 118 that includes one or more programmable indicators, such as at a field 119, that can be used to control various functionality of the data processors. For example, a NaN type indicator can be stored at field 119 to indicate whether NaN values produced as resultants of arithmetic instructions are sNaNs or qNaN. By way of example, the embodiments described NaNs that resultants of arithmetic instructions, and other instructions, are qNaNs unless stated otherwise.

An instruction downstream from an instruction that first generated a qNaN resultant, e.g., based on one or more FPNs, can receive the qNaN resultant as an operand. In response to receiving a qNaN resultant an operand, the second arithmetic floating-point instruction can itself provide qNaN resultant. When a qNaN resultant is based upon a qNaN operand, the qNaN is said to be "propagated" through the instruction.

Figure 3:
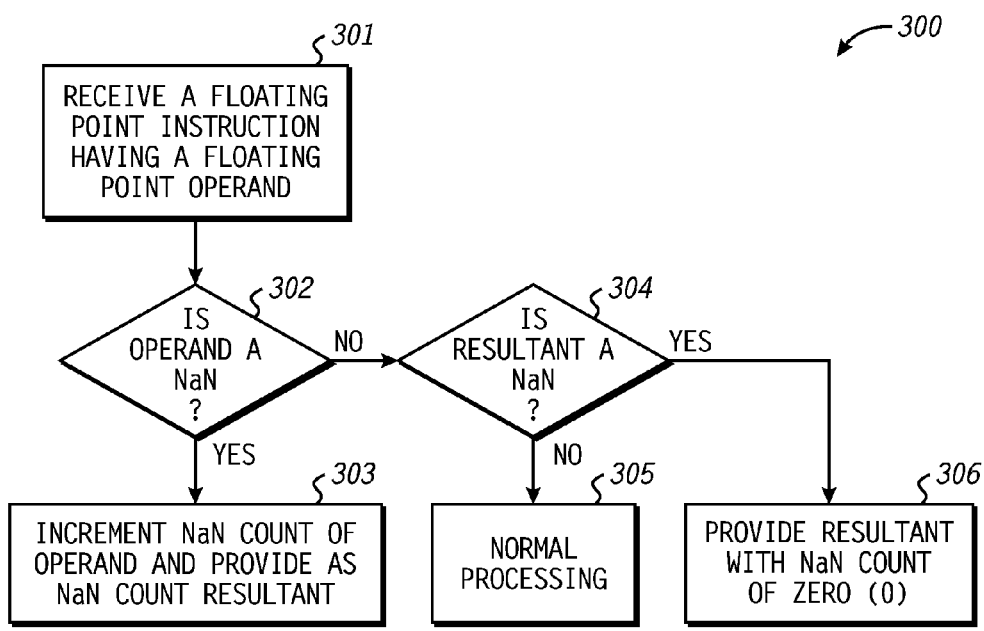
FIG. 3 is a flow diagram illustrating a method for performing an embodiment of the present disclosure.

According to a specific embodiment, a qNaN data value can include a count that indicates the number of times a particular qNaN has been propagated. FIG. 3 illustrates a flow diagram 300 of an embodiment of the present disclosure in which a floating-point instruction increments a count value in a qNaN operand.

Flow diagram 300 begins with step 301, receiving a floating-point instruction having a single floating-point operand. As the instruction is executed by an execution unit, the execution unit communicates with a data fetch unit to receive operands the instruction's operands. As described previously, a portion of the floating-point operand, e.g., the exponent/NaN indicator field, stores information indicating whether the value of the operand represents a floating-point number (FPN) or a NaN, as described previously.

At step 302, the instruction operand is evaluated to determine whether the operand is a qNaN. In response to the operand being a qNaN, the method progresses to step 303 where the qNaN data value, which is as discussed above represents a qNaN propagation count, is incremented and the incremented operand value is provided as the resultant of the current instruction. In response to the operand not being a qNaN, the operand is a FPN, and the method progresses from step 302 to step 304, which determines whether the calculation performed by the floating-point instruction caused a qNaN to be generated. If not, flow proceeds normally at 305 and a floating-point number resultant is provided. Otherwise, if execution resulted in a qNaN resultant flow proceeds from 304 to 306, where a qNaN resultant having a data value representing a count of zero is provided. The count of zero is predefined to the count value that indicates the qNaN was generated based upon a FPN, not by propagating a qNaN operand.

Table 1 illustrates operation of a particular arithmetic floating-point instruction that increments a count value stored in a data value field of a qNaN operand. The instruction can be a square root instruction having the format "SQRT OPERAND DESTINATION", where OPERAND identifies the value of which the square root will be determined, and RESULTANT is the resultant as provided. At Row 1, the floating-point instruction has received an operand that is a FPN, and a resultant is generated that can be either a FPN or a qNaN with a data value (DV) having a predefined value, such as zero. According to a particular embodiment the DV is zero (0) at line 1 to indicate the resultant qNaN was generated based upon an FPN, e.g., it was not propagated based upon an operand qNaN.

TABLE 1

Instruction Implementing Counting qNaNs

| | OPERAND | RESULTANT |
|---|---|---|
| 1 | FPN | FPN or qNaN (DV = 0) |
| 2 | qNaN (DV = Num) | qNaN (DV = Num + Inc) |

At Row 2, the operand is a qNaN operand having a data value Num, where Num is an integer that is indicative of a propagation count, e.g., the number of previous instructions a qNaN operand has been propagated through. In response to receiving a qNaN operand, execution of the instruction of Table 1 will increment the count value of the qNaN operand data value field to determine an incremented count, and provide a qNaN resultant having a propagation count equal to the incremented count.

Figure 4:
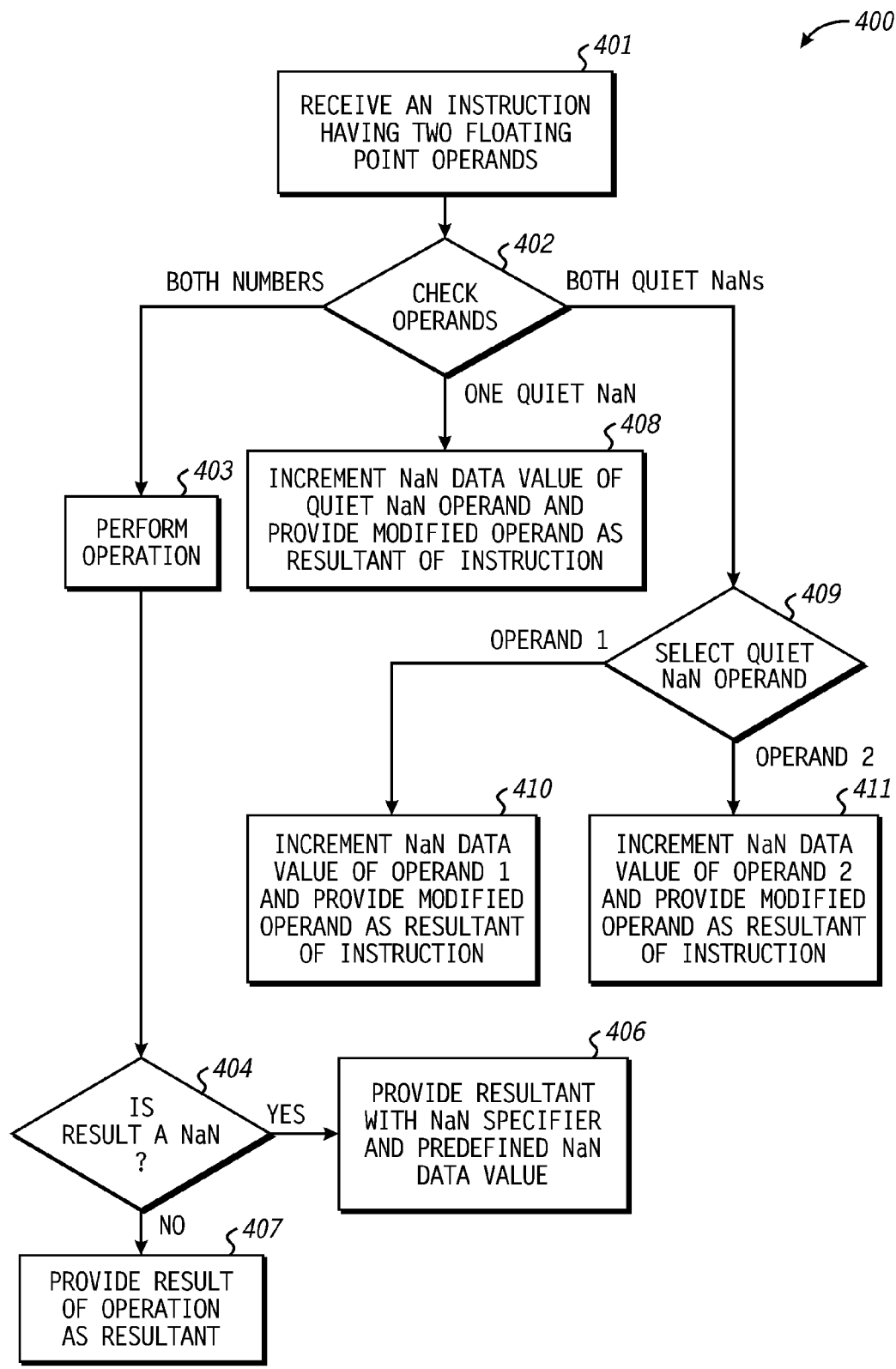
FIG. 4 is a flow diagram illustrating a method for performing an embodiment of the present disclosure.

FIG. 4 shows flow diagram 400, illustrating a method for handling an instruction that receives a plurality of floating-point operands and produces a single resultant. Flow diagram 400 begins at step 401 where a floating-point instruction having two floating-point operands is received.

At step 402, the two floating-point operands are checked to determine whether both operands are floating-point numbers, one operand is a qNaN, or if both operands are qNaNs. When both operands are FPNs, the method proceeds to step 403. At step 403, the instruction operation is performed, for example a floating-point divide instruction divides a dividend operand by a divisor operand and flow proceeds to step 404. At step 404, the result of the floating-point instruction is checked. If the result of the operation is a qNaN, for example the result of dividing zero by zero, the method proceeds to step 406, where the instruction provides a floating-point value resultant that includes a NaN specifier indicating that the resultant is a qNaN, and including a NaN propagation count having a predetermined value, for example the value '0'. Otherwise, flow proceeds from step 404 to step 407 where the instruction provides a FPN resultant.

Returning to step 402, when one of the two operands is a qNaN and the other operand is a FPN, the method proceeds to step 408. At step 408, the propagation count of the qNaN is incremented and provided as the propagation count data value of a qNaN resultant of the instruction.

When at 402 it is determined that both operands of the instruction are qNaNs, the method proceeds to step 409. At step 409, one of the operands is selected to be incremented. The selection as to which operand is to be incremented can be based on a comparison of the two NaN data values of the operands. In one embodiment, the operand with the larger NaN data value is selected. In another embodiment, the operand with the smaller NaN data value is selected to be incremented, wherein an advantage to selecting the larger count to increment is that the result indicates the earliest point in time at which a NaN resultant was generated as the resultant of non-NaN input operand(s) for this particular sequence of data-dependent operations. When OPERAND 1 is selected, the method proceeds to step 410. At step 410 the NaN data value of OPERAND 1 is incremented and the modified operand is provided as the resultant of the instruction. When OPERAND 2 is selected at step 409, the method proceeds to step 411. At step 411 the NaN data value of OPERAND 2 is incremented and the modified operand is provided as the resultant of the instruction.

While the flow diagram of FIG. 4 illustrates a specific example that selects one of two qNaN operands to be incremented based upon which is larger or smaller, it will be appreciated that other embodiments are possible. Table 2 illustrates various manners in which an arithmetic instruction can handle qNaN processing. In particular, Table 2 represents operation of a Divide instruction of the format "DIV DIVIDEND DIVISOR DESTINATION", where DIVIDEND identifies the dividend, DIVISOR identifies the divisor, and DESTINATION is where a resultant will be stored.

At Row 1 of Table 2, the floating-point instruction has received two operands that are floating-point numbers (FPNs), and a resultant is generated that can be either a FPN, or a qNaN with a predefined value, as previously described, based upon the FPN operands.

TABLE 2

DIV Instruction With Two Operands Implementing Counting NaNs

| | DIVIDEND | DIVISOR | RESULTANT |
|---|---|---|---|
| 1 | FPN | FPN | FPN or qNaN (DV = 0) |
| 2 | qNaN (DV = Num) | FPN | qNaN (DV = Num + Inc) |
| 3 | FPN | qNaN (DV = Num) | qNaN (DV = Num + Inc) |
| 4 | qNaN (DV = Num1) | qNaN (DV = Num2) | A) qNaN (DV = Num1 + Inc) <br> B) qNaN (DV = Num2 + Inc) <br> C) qNaN (DV = max(Num1 + Inc, Num2 + Inc) <br> D) qNaN (DV = min(Num1 + Inc, Num2 + Inc) <br> E) qNaN (DV = fn(Num1, Num2) |

At Row 2, the dividend is a qNaN operand having a count value, Num, where Num is a propagation count as previously described, and the divisor, is a FPN. In response to receiving a qNaN dividend, the propagation count of the qNaN will be incremented to determine an incremented count that is provided as the propagation count of a qNaN resultant.

At Row 3, the dividend is a FPN and the divisor is a qNaN having a propagation count, Num. In response to receiving a qNaN divisor, the propagation count of the qNaN will be incremented to determine an incremented count that is provided as the propagation count of a qNaN resultant.

At Row 4, both the dividend and divisor are qNaNs having propagation counts Num1 and Num2, respectively. Because the divide instruction results in a single resultant there are different possibilities of generating a value of the resultant. For example, the propagation count data value (DV) of the resultant can be determined A) by always incrementing the propagation count of the dividend (Num1) and providing the incremented value as the resultant; B) by always incrementing the propagation count of the divisor (Num2) to generate an incremented value and providing the incremented value as the resultant; C) by incrementing the larger of the dividend propagation count (Num1) and the divisor propagation count (Num2) to generate an incremented value and providing the incremented value as the resultant; D) by incrementing the smaller of the dividend propagation count (Num1) and the divisor propagation count (Num2) to generate an incremented value and providing the incremented value as the resultant; E) by determine the resultant data value based on some other function of Num1 and Num2, such as determining the sum of Num1 and Num2.

Table 3 illustrates an alternate embodiment of a floating-point instruction that selectively increments qNaN propagation counts based upon whether a control indicator is asserted or negated, such as an indicator that can be stored at register field 119 of FIG. 1. By way of example, Table 3 represents operation of a divide instruction of the same format as previously described with reference to Table 2. In addition to DIVIDEND and DIVISOR columns, Table 3 includes a column labeled cqNaN_EN that indicates the state of a control value that when asserted, e.g., a logic one (1), allows the propagation count of qNaNs to be incremented, and when negated, e.g., a logic zero (0), prevents the propagation count of qNaNs from being incremented.

At Row 1 of Table 3, the floating-point instruction has received a dividend and divisor that are both FPNs and the indicator cqNaN_EN is asserted. In response, a resultant is generated that can be either a FPN, or a qNaN with a predefined value, as previously described, based upon the FPN operands.

TABLE 3

Instruction Implementing Counting NaNs with Selective Increment

| | DIVIDEND | DIVISOR | cqNaN_EN | DESTINATION |
|---|---|---|---|---|
| 1 | FPN | FPN | 1 | FPN or qNaN (DV = 0) |
| 2 | FPN | FPN | 0 | A) FPN or qNaN (DV = 0) <br> B) FPN or qNaN (No DV) |
| 3 | qNaN (DV = Num)/ FPN | FPN/ qNaN (DV = Num) | 1 | qNaN (DV = Num + Inc) |
| 4 | qNaN (DV = Num)/ FPN | FPN/ qNaN (DV = Num) | 0 | A) qNaN (DV = Num) <br> B) FPN or qNaN (No DV) |
| 5 | qNaN (DV = Num1) | qNaN (DV = Num2) | 1 | A) qNaN (DV = Num1 + Inc) <br> B) qNaN (DV = Num2 + Inc) <br> C) qNaN (DV = max(Num1, Num2) + Inc) <br> D) qNaN (DV = min(Num1, Num2) + Inc) <br> E) qNaN DV = fn(Num1, Num2) |
| 6 | qNaN (DV = Num1) | qNaN (DV = Num2) | 0 | A) qNaN (DV = Num1) <br> B) qNaN (DV = Num2) <br> C) qNaN (DV = Predefined) <br> D) FPN or qNaN (No DV) |

At Row 2 the floating-point instruction has received a dividend and divisor that are both FPNs and the indicator cqNaN_EN is negated. In response, the instruction can generate a resultant in various manners, including A) provide an FPN or a qNaN with a predefined value representing a count, e.g., such as zero, as described above; or B) provide a FPN or a qNaN with no data value representing a count, e.g., the information in the count field is undefined.

At Row 3 one of the dividend and divisor is an FPN and the other is a qNaN having a NaN data value that represents a propagation count, and indicator cqNaN_EN is asserted. In response, the resultant will be a qNaN with an incremented count based upon the count of the qNaN operand. At Row 4 one of the dividend and divisor is an FPN and the other operand is a qNaN having a data value that represents a propagation count, and indicator cqNaN_EN is negated. In response, the propagation count of the qNaN operand is not incremented and instruction can generated a resultant in various manners, including A) provide a qNaN having the same NaN data value as the qNaN operand, or B) provide a FPN or a qNaN with no data value representing a count, e.g., the information in the count field can be undefined.

At Row 5, both OPERAND 1 and OPERAND 2 are qNaNs having defined data values, Num1 and Num2, respectively, representing propagation counts and indicator cqNaN_EN is asserted. In response, execution of the instruction results in a qNaN resultant with one of the two data values incremented. The data value incremented can be selected in a variety of manners including A) always increment the data value of OPERAND 1; B) always increment the data value of OPERAND 2; C) increment the larger data value of the two operands; D) increment the smaller data value of the two operands; or E) determine the resultant data value based on some other function of Num1 and Num2, such as determining the sum of Num1 and Num2.

At Row 6, both OPERAND 1 and OPERAND 2 are qNaNs having defined data values, Num1 and Num2, respectively, representing propagation counts, and indicator cqNaN_EN is negated. Execution of the instruction results in a qNaN resultant with a data value. The data value can be generated in a variety of manners including A) being equal to the data value of OPERAND 1; B) being equal to the data value of OPERAND 2; c) being equal to a predefined value; or D) provide a FPN or a qNaN with no data value representing a count, e.g., the information in the count field can be undefined.

Figure 5:
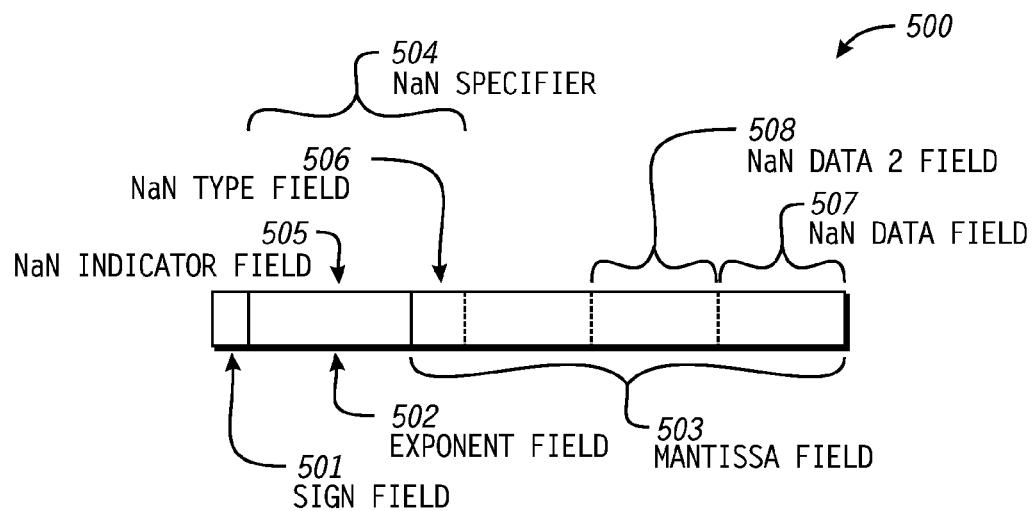
FIG. 5 is a diagram of a floating-point format having two NaN data values in accordance with at least one embodiment of the present disclosure.

According to further embodiments of the present disclosure, a floating-point value may be a NaN having a plurality of NaN data values. FIG. 5 illustrates floating-point partition 500 for a NaN having a plurality of NaN data values stored at fields 501 through 508. Fields 501 through 507 have the same functions and values as described previously with respect to fields 201 through 207 of FIG. 2, respectively. In addition, the partitioning 500 includes NaN Data 2 Field 508 that comprises bit positions within floating-point partition 500 distinct from NaN Data field 507, NaN indicator field 505 and NaN Type field 505. For purposes of illustration, NaN Data Field 507 and NaN Data 2 Field 508 are shown comprising the least significant bit positions of floating-point partition 500 although other bit positions may be used according to embodiments of the disclosure. Values of NaN Data Field 507 and NaN Data 2 Field 508 can be collectively referred to as "data values" of a qNaN. The operand two data fields can be used during execution of an instruction to maintain information for two operands, as will be better understood with reference to the example of Table 4.

Table 4 has a similar format as Table 2 and illustrates a manner in which a particular floating-point instruction, e.g., a divide instruction by example, can generate a NaN resultant with two data values based upon one or more NaN operands with two data values. At Row 1, the NaN evaluation instruction has received two operands that are floating-point numbers, and generates a resultant that is either a FPN or a qNaN with predefined values for DV1 and DV2, where the zero indicates a propagation count that indicates the qNaN was first generated by the current instruction.

TABLE 4

Floating-point instruction with counting NaN values -
NaN Operands with Multiple Data Values

| | DIVIDEND | DIVISOR | RESULTANT |
|---|---|---|---|
| 1 | FPN | FPN | FPN or qNaN (DV1 = 0; DV2 = 0) |
| 2 | qNaN (DV1 = Num1) (DV2 = Num2) | FPN | A) qNaN (DV1 = Num1 + Inc; DV2 = Num2) B) qNaN (DV1 = Num1 + Inc; DV2 = 0) |
| 3 | FPN | qNaN (DV1 = Num1) (DV2 = Num2) | A) qNaN (DV1 = Num1; DV2 = Num2 + Inc) B) qNaN (DV1 = 0; DV2 = Num2 + Inc) |
| 4 | qNaN (DV1 = Num1) (DV2 = Num2) | qNaN (DV1 = Num3) (DV2 = Num4) | A) qNaN (DV1 = Num1 + Inc; DV2 = Num2) B) qNaN (DV1 = Num1 + Inc; DV2 = 0) C) qNaN (DV1 = Num3; DV2 = Num4 + Inc) D) qNaN (DV1 = 0; DV2 = Num4 + Inc) E) qNaN (DV1 = Num1 + Inc; DV2 = Num4 + Inc) F) qNaN (DV1 = max(Num1, Num3) + Inc; DV2 = max(Num2, Num4) + Inc) |

At Row 2, the dividend of the divide instruction is a qNaN operand having defined data values Num1 and Num2, and the divisor is a FPN. Evaluation of the floating-point instruction can generate a resultant in various manners including generating a resultant that is generated by A) qNaN having a count that is based on the count data value of the qNaN divisor (DV1), e.g., Num1 is incremented, and second count (DV2) that is equal to the DV2 data value of the qNaN operand, e.g., Num2 is propagated but not incremented; or by B) a qNaN having a count that is based on the count data value of the qNaN divisor, and a DV2 data value that is equal to a predefined value, such as zero (0).

At Row 3, the dividend is a FPN and the divisor is a qNaN operand having defined data values Num1 and Num2 Evaluation of the floating-point instruction results can generate a resultant in various manners including generating a resultant that is generated by A) a qNaN having a divisor count (DV2) that is based on DV2 data value of the qNaN divisor, e.g., an Num2 is incremented, and a DV1 data value that is equal to the DV1 data value of the qNaN operand; B) a qNaN having a DV2 that is based on the DV2 data value of the qNaN operand, e.g., an incremented value, and a DV1 data value that is equal to a predefined value, such as zero (0).

At Row 4, the dividend is a qNaN operand having defined data values Num1 and Num2, and the divisor is a qNaN operand having defined data values Num3 and Num4. Evaluation of the floating-point instruction results in a resultant that is a qNaN. For example, the resultant can be A) a qNaN having a DV1 value that is based on DV1 data value of the divisor, e.g., Num1+1, and a DV2 data value that is equal to the DV2 data value of the divisor, e.g., Num2+1; B) a qNaN having a DV1 that is based on DV1 data value of divisor 1, e.g., Num1+1, and a DV2 data value that is equal to a predefined value, such as zero (0); C) a qNaN having a DV1 value that is equal to the DV3 data value of the divisor, and a DV2 data value that is based on the DV2 value of the divisor, e.g., Num4+1; D) a qNaN having a DV1 data value that is equal to a predefined value, such as zero (0), and a DV2 data value that is based on the DV4 data value of the divisor, e.g., Num4+1;

E) a qNaN having a DV1 data value that is based on the DV1 value of the dividend, e.g., Num1+1, and a DV2 data value that is based on the DV4 value of the divisor, e.g., Num4+1; or F) a qNaN having a DV1 data value that is based on the larger of the dividend DV1 value and the divisor DV1 data value, and a DV2 data value that is based on the larger of the dividend DV2 value and the divisor DV2 data value. It will be appreciated that in other embodiments, the resultant at Row 4 can have its values DV1 and DV2 generated based upon whether a corresponding operand of the divisor or dividend has a smaller dividend/divisor data values.

According to a particular embodiment, an exception handler can be configured to not generate exceptions for qNaN resultants, but to generate exceptions for other conditions, such as generation of a sNaN resultant. According to a specific embodiment, an instruction referred to as a "qNaN evaluation instruction" can be used in executable code to determine if some or all of its operands are qNaN values, and if so, provides a resultant of a different type that causes an exception. For example, in accordance with one embodiment of the present disclosure, a qNaN evaluation instruction can generate a sNaN resultant in response to receiving a qNaN operand, where a sNaN resultant does cause a sNaN exception to be generated. This can be more efficient than having an instruction test every resultant to see if it is a qNaN resultant at a predetermined instruction checkpoint, and invoking the exception handler if a qNaN that can affect a system's size and performance cost.

Note that the sNaN exception that is caused by a sNaN resultant can be a generic exception, e.g., a floating-point invalid result exception, or an exception specific to a sNaN. Furthermore, the qNaN evaluation instruction can propagate an operand to provide the resultant, wherein the if the operand is a qNaN operand the NaN type indicator is changed to indicate a sNaN, instead of a qNaN, before being provided as the resultant of the qNaN. In other embodiments, the qNaN evaluation instruction need not actually produce a NaN resultant, e.g. a value that would be stored, but instead can set a control indicator that indicates whether a qNaN was one of its operands, and if so, generates a sNaN exception without generating an actual resultant that is stored at a memory location.

Figure 6:
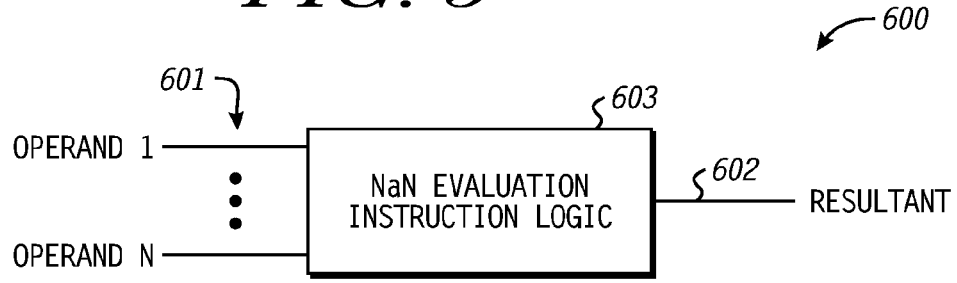
FIG. 6 is a diagram of a NaN evaluation instruction in accordance with at least one embodiment of the present disclosure.

FIG. 6 is a block diagram that represents a qNaN evaluation instruction 600 that receives one or more floating-point operands 601, labeled OPERAND 1 through OPERAND n, and generates a resultant 602 from operands 601. The NaN evaluation logic 603 represents portions of an execution unit that is used to execute the qNaN evaluation instruction, which may include combinatorial logic, state machine logic, microcoded logic or other processor instruction implementation techniques.

Figure 7:
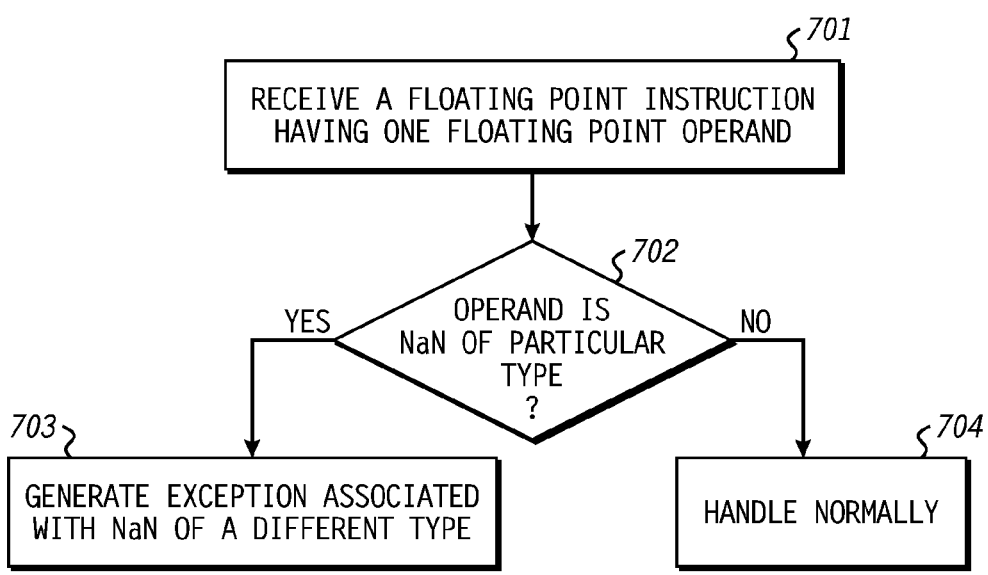
FIG. 7 is a flow diagram illustrating a method corresponding to a particular type of NaN evaluation instruction.

FIG. 7 illustrates flow diagram 700 illustrating a method for performing an embodiment of the present disclosure in which a data processor executes a qNaN evaluation instruction represented at FIG. 6 having at least one floating-point operand. Flow diagram 700 begins with step 701, receiving a floating-point instruction having at least one floating-point operand. As described previously, a portion of the floating-point operand, e.g., the exponent/NaN indicator field, stores information indicating whether the value of one of operands represents a floating-point number (FPN) or a qNaN.

In step 702, the operands are evaluated to determine if the operands meets a particular condition, such as whether an operand is a qNaN, e.g., is one of the operands of a particular type. In response to the condition being met the method progresses to step 703, where an exception is generated. For example, a qNaN operand value can be modified to indicate a different NaN type, such as a sNaN, that is provided as a resultant that causes the exception to occur. In response to the condition not being met at step 702, e.g., the operand is a FPN and flow proceeds to step 704 where an operand is reproduced. Note that while embodiments herein describes providing a floating-point operand as the resultant of a sNaN evaluation instruction, in other embodiments, a qNaN evaluation instruction can provide a different type indicator, such as a non-floating-point resultant, or set an indicator at a specific register location.

Table 5 illustrates the manner in which a particular qNaN evaluation instruction operates in accordance with a particular embodiment of the disclosure. Each row of Table 5 indicates, at the column labeled OPERAND, whether an operand is a qNaN or a FPN, and a particular resultant at the column labeled RESULTANT. At Row 1, the NaN evaluation instruction has received an operand that is a floating-point number (FPN), and a resultant can be generated that indicates the resultant was an FPN. For example, the resultant can be A) a FPN equal to the FPN operand; or B) a predefined indicator, other than a floating-point value, indicating the operand was an FPN. It will be appreciated that for each row indicating multiple possible resultants, that a particular instruction can be implemented that generates one of the indicated results, or that a plurality of instructions can be implemented, each generating one of the indicated results. Examples of providing a predefined indicator can include providing a non-floating-point value, or setting a register field to various predefined values.

TABLE 5

Embodiments of Signaling NaN Generation With One Operand

| | OPERAND | RESULTANT |
|---|---|---|
| 1 | FPN | A) FPN |
| | | B) Predefined indicator indicating FPN |
| 2 | qNaN | A) sNaN (Info = same as qNaN) |
| | | B) sNaN (Info = Predefined) |
| | | C) Predefined indicator indicating operand was NaN |

At Row 2, the qNaN evaluation instruction has received an operand that is a qNaN. In response to testing the operand to determine if one it is a qNaNs, a resultant can be provided that is A) a floating-point sNaN having the same information as the qNaN operand, except for the NaN type indicator, e.g., if the input operand is a qNaN, changing the value of the input operand to convert it to a sNaN, and then using the converted result as the resultant to, not that it is also possible to conditionally produce multiple sNaN results, one for each input operand which is a qNaN, and to pass unchanged those inputs which are not qNaNs; B) provide a resultant that is a floating-point sNaN with information that is predefined, e.g., not propagated; C) provide a resultant, other than a floating-point value, indicating the operand was a qNaN.

Table 6 illustrates the manner in which a particular qNaN evaluation instruction that receives multiple operands operates in accordance with a particular embodiment of the disclosure. Each row of Table 6 indicates an instruction operand at the column labeled OPERAND_1, an instruction operand at the column labeled OPERAND_2, and a resultant and the column labeled RESULTANT. At Row 1, the qNaN evaluation instruction has received operands that are both FPNs. In response, a resultant that does not generate an associated exception can be generated. For example, the resultant can be A) a FPN equal to the FPN of one of the operands or a function based on both operands; or B) a predefined indicator, other than a floating-point value, indicating the operand was an FPN.

TABLE 6

Embodiments of Signaling NaN Generation With Two Operands

| | OPERAND_1 | OPERAND_2 | RESULTANT | |
|---|---|---|---|---|
| 1 | FPN1 | FPN2 | A) | One of FPN1, FPN2, or combination |
| | | | B) | Predefined indicating FPN operands |
| 2 | qNaN (DV = Num1) | FPN | A) | sNaN (No DV) |
| | | | B) | sNaN (DV = Num1) |
| | | | C) | sNaN (DV = 1) |
| | | | D) | Predefined Indicator |
| 3 | FPN | qNaN (DV = Num1) | A) | sNaN (No DV) |
| | | | B) | sNaN (DV = Num1) |
| | | | C) | sNaN (DV = 2) |
| | | | D) | Predefined Indicator |
| 4 | qNaN (DV = Num1) | qNaN (DV = Num2) | A) | sNaN (No DV) |
| | | | B) | sNaN (DV = Num1) |
| | | | C) | sNaN (DV = Num2) |
| | | | D) | sNaN (DV = 3) |
| | | | E) | sNaN (DV = max(Num1, Num2)) |
| | | | F) | sNaN (DV = min(Num1, Num2)) |
| | | | G) | Predefined Indicator |

At Row 2, OPERAND 1 is a qNaN operand, which may or may not have a data value, and OPERAND 2 is a FPN. In response, to OPERAND 1 being a qNaN, a resultant can be generated that causes a sNaN exception. For example, the resultant can be A) a floating-point sNaN with no data value; B) a sNaN value with a data value equal to the data value of the qNaN OPERAND_1, if any; C) a SNaN having a data value that indicates OPERAND_1 is a qNaN and OPERAND_2 is an FPN, e.g., DV=1; or D) a predefined indicator, other than a floating-point value, indicating an operand was a qNaN.

At Row 3, OPERAND 1 is FPN operand, and OPERAND 2 is a qNaN that may or may not have a data value. In response, to OPERAND 2 being a qNaN, a resultant can be generated that causes a sNaN exception. For example, the resultant can be A) a floating-point sNaN with no data value; B) a sNaN value with a data value equal to the data value of the qNaN operand; C) a sNaN having a data value that indicates OPERAND_1 is a FPN and OPERAND_2 is a qNaN, e.g., DV=2; or C) a predefined indicator, other than a floating-point value, indicating OPERAND_2 was a qNaN.

At Row 4, OPERAND 1 and OPERAND_2 ARE qNaN operands, which may or may not have a data values representing propagation counts. In response, to the operands being qNaNs, a resultant can be generated that causes a sNaN exception. For example, the resultant can be A) a floating-point sNaN with no data value; B) a sNaN value with a data value equal to the data value of the qNaN OPERAND_1; C) a sNaN value with a data value equal to the data value of the qNaN OPERAND_2; D) a SNaN having a data value that indicates OPERAND_1 and OPERAND_2 are qNaNs, e.g., DV=3; or E) a sNaN value with a data value equal to larger of the data values of OPERAND_1 and OPERAND_2; F) a sNaN value with a data value equal to smaller of the data values of OPERAND_1 and OPERAND_2; or G) a predefined indicator, other than a floating-point value, indicating one or both operands were qNaNs.

Each of the various instructions described above can be implemented as distinct opcodes. The instructions can be single, or fixed, cycle instructions to be implemented to test for the qNaN operand and generate resultant(s), and conditional exception generation as the side effect of detecting a sNaN result which is a simple logical operation on the qNaN.

In a first aspect, a method can include receiving at an execution unit of a data processor a first floating point instruction identifying a first floating point operand comprising a first portion and a second portion, and in response to determining at the data processor that a first condition is met that includes the first portion having a NaN indicator that indicates the first floating point operand is not a number, incrementing a first value at the second portion to generate an incremented value.

In one embodiment of the first aspect, the first value is a propagation count indicating a number of instructions through which a NaN operand has been previously propagated. In a further embodiment, the NaN indicator indicates that the NaN is of a type that does not generate an exception. In still a further embodiment, the NaN indicator indicates that the NaN is of a type that does generate an exception in response to being generated. In yet a further embodiment the floating point instruction further identifies a second floating point operand comprising a first portion and a second portion, and the first condition being met further comprises the first portion of the second operand indicating the second operand is a number. In yet another further embodiment, the first floating point instruction further identifies a second floating point operand comprising a first portion and a second portion, and the first condition being met further comprises the first portion of the second floating point operand having the NaN indicator indicating that the second floating point operand is not a number, and, incrementing the first value at the second portion of the first floating point operand is in response to the first value at the second portion of the first floating point operand being greater than a first value at the second portion of the second floating point operand. In yet another further embodiment, the first floating point instruction further identifies a second floating point operand comprising a first portion and a second portion, and the first condition being met further comprises the first portion of the second floating point operand having the NaN indicator that indicates the second floating point operand is not a number, and, incrementing the first value at the second portion of the first floating point operand is in response to the first value at the second portion of the first floating point operand being less than a first value at the second portion of the second floating point operand.

In another embodiment of the first aspect, the method includes providing from the execution unit a resultant of the first floating point instruction, a first portion of the resultant indicating the resultant is a NaN, and a second portion of the resultant having the incremented value. In a further embodiment, the first floating point instruction further identifies a second floating point operand comprising a first portion and a second portion, and in response to a second condition being met that includes the first portion of the first floating point operand and the first portion of the second point operand each having NaN indicators, generating a third value as part of the resultant, the third value based upon a sum of a value at the first portion of the first floating point operand and a value at the second portion of the second floating point operand.

In another embodiment of the first aspect, the incremented value is a first incremented value, and the first floating point instruction further identifies a second floating point operand comprising a first portion and a second portion, and in response to a second condition being met that includes the first portion of the second floating point operand having the NaN indicator, incrementing a value at the second portion of the second operand to generate a second incremented value. The method further includes providing from the execution unit a resultant of the first floating point instruction, the resultant comprising a first portion having the NaN indicator, a second portion having the first incremented value, and a third portion having the second incremented value.

In a second aspect, a method can include receiving at an execution unit of a data processor a first floating point instruction identifying at least one floating point operand, and generating a resultant for the first floating point instruction comprising a NaN indicator and a predefined value, the predefined value indicative that the resultant was not determined based upon a NaN operand.

In one embodiment of the second aspect, the resultant does not cause an exception to occur. In another embodiment of the second aspect, the resultant does cause an exception to occur. In still another embodiment of the second aspect, the method includes receiving at the execution unit a second instruction that uses the resultant of the first floating point instruction as an operand, and generating a resultant for the second instruction comprising a NaN indicator and an incremented value, the incremented value being based upon the predefined value of the resultant for the first floating point instruction. In an additional embodiment of the second aspect, the first floating point instruction is an arithmetic instruction. In an even further embodiment of the second aspect, in the NaN indicator resultant does not generate an exception in response to being generated.

In a third aspect, a processor device that executes floating point instructions to generate a resultant, each floating point operand and floating point resultant having a plurality of bit locations including a first location that includes a first set of one or more bits and a second location that includes a second set of one or more bits, the processor device can include a fetch unit to fetch a floating point instruction, and an execution unit that, in response to a first condition being present during execution of the floating point instruction, is to increment a first value stored at the first location of a first floating point operand of the floating point instruction to generate a first incremented value, the first condition being present in response to a value stored at the second location of the first operand indicting the first operand is a NaN.

In one embodiment of the third aspect, the execution unit is further to provide a resultant of the first floating point instruction that is a NaN having the incremented value at the first location. In another embodiment of the third aspect, the first value is selected to be incremented over a second value stored at a third location of the floating point operand by virtue of the first value being greater than the second value. In yet another embodiment of the third aspect, in response to a second condition being present during execution of the floating point instruction, the execution unit is to increment a second value stored at the first location of a second floating point operand of the floating point instruction to generate a second incremented value, the second condition being present in response to a value stored at the second location of the second operand indicating the second operand is a NaN.

In a fourth aspect, a method can include receiving at an execution unit of a data processor a first floating point instruction identifying one or more first floating point operands, each of the one or more first floating point operands being floating point numbers, and responsive to execution of the first floating point instruction generating a NaN, selectively providing a NaN resultant of a first type or a NaN resultant of a second type based upon an indicator stored at a storage location, wherein the NaN resultant of the first type causes an exception to occur, and the Nan resultant of the second type does not cause an exception to occur.

The specification and drawings should be considered exemplary only, and the scope of the disclosure is accordingly intended to be limited only by the following claims and equivalents thereof. Other embodiments, uses, and advantages of the disclosure will be apparent to those skilled in the art from consideration of the specification and practice of the disclosure disclosed herein. For example, the specific example described above has been with respect to a NaN of type qNaN, though it will be appreciated that in other embodiments, the techniques described herein can apply to generation of other types of NaNs as well.

In this document, relational terms such as "first" and "second", and the like, may be used solely to distinguish one entity or action from another entity or action without necessarily requiring or implying any actual such relationship or order between such entities or actions. The terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus. An element preceded by "comprises . . . a" does not, without more constraints, preclude the existence of additional identical elements in the process, method, article, or apparatus that comprises the element.

What is claimed is:

1. A method comprising:
   receiving at an execution unit of a data processor a first floating point instruction identifying a first floating point operand comprising a first portion and a second portion; and
   in response to determining at the data processor that a first condition is met that includes the first portion having a NaN indicator that indicates the first floating point operand is not a number, incrementing a first value at the second portion to generate an incremented value.

2. The method of claim 1, wherein the first value is a propagation count indicating a number of instructions through which a NaN operand has been previously propagated.

3. The method of claim 2, wherein the NaN indicator indicates that the NaN is of a type that does not generate an exception.

4. The method of claim 2, wherein the NaN indicator indicates that the NaN is of a type that does generate an exception in response to being generated.

5. The method of claim 2, wherein:
   the first floating point instruction further identifies a second floating point operand comprising a first portion and a second portion; and
   the first condition being met further comprises the first portion of the second operand indicating the second operand is a number.

6. The method of claim 2, wherein:
   the first floating point instruction further identifies a second floating point operand comprising a first portion and a second portion; and
   the first condition being met further comprises the first portion of the second floating point operand having the NaN indicator indicating that the second floating point operand is not a number, and, incrementing the first value at the second portion of the first floating point operand is in response to the first value at the second portion of the first floating point operand being greater than a first value at the second portion of the second floating point operand.

7. The method of claim 2, wherein:
the first floating point instruction further identifies a second floating point operand comprising a first portion and a second portion; and
the first condition being met further comprises the first portion of the second floating point operand having the NaN indicator that indicates the second floating point operand is not a number, and, incrementing the first value at the second portion of the first floating point operand is in response to the first value at the second portion of the first floating point operand being less than a first value at the second portion of the second floating point operand.

8. The method of claim 1, further comprising:
providing from the execution unit a resultant of the first floating point instruction, a first portion of the resultant indicating the resultant is a NaN, and a second portion of the resultant having the incremented value.

9. The method of claim 8 wherein:
the first floating point instruction further identifies a second floating point operand comprising a first portion and a second portion; and
in response to a second condition being met that includes the first portion of the first floating point operand and the first portion of the second point operand each having NaN indicators, generating a third value as part of the resultant, the third value based upon a sum of a value at the first portion of the first floating point operand and a value at the second portion of the second floating point operand.

10. The method of claim 1, wherein the incremented value is a first incremented value, and the first floating point instruction further identifies a second floating point operand comprising a first portion and a second portion; and
in response to a second condition being met that includes the first portion of the second floating point operand having the NaN indicator, incrementing a value at the second portion of the second operand to generate a second incremented value; and
providing from the execution unit a resultant of the first floating point instruction, the resultant comprising a first portion having the NaN indicator, a second portion having the first incremented value, and a third portion having the second incremented value.

11. A method comprising:
receiving at an execution unit of a data processor a first floating point instruction identifying at least one floating point operand; and
generating a resultant for the first floating point instruction comprising a NaN indicator and a predefined value, the predefined value indicative that the resultant was not determined based upon a NaN operand.

12. The method of claim 11, wherein the resultant does not cause an exception to occur.

13. The method of claim 11, wherein the resultant does cause an exception to Occur.

14. The method of claim 11, further comprising:
receiving at the execution unit a second instruction that uses the resultant of the first floating point instruction as an operand; and
generating a resultant for the second instruction comprising a NaN indicator and an incremented value, the incremented value being based upon the predefined value of the resultant for the first floating point instruction.

15. The method of claim 11, wherein the first floating point instruction is an arithmetic instruction.

16. The method of claim 11, where in the NaN indicator resultant does not generate an exception in response to being generated.

17. A processor device that executes floating point instructions to generate a resultant, each floating point operand and floating point resultant having a plurality of bit locations including a first location that includes a first set of one or more bits and a second location that includes a second set of one or more bits, the processor device comprising:
a fetch unit to fetch a floating point instruction; and
an execution unit that, in response to a first condition being present during execution of the floating point instruction, is to increment a first value stored at the first location of a first floating point operand of the floating point instruction to generate a first incremented value, the first condition being present in response to a value stored at the second location of the first operand indicting the first operand is a NaN.

18. The processing device of claim 17, wherein the execution unit is further to provide a resultant of the first floating point instruction that is a NaN having the incremented value at the first location.

19. The processing device of claim 17, wherein the first value is selected to be incremented over a second value stored at a third location of the floating point operand by virtue of the first value being greater than the second value.

20. The processing device of claim 17, wherein:
in response to a second condition being present during execution of the floating point instruction, the execution unit is to increment a second value stored at the first location of a second floating point operand of the floating point instruction to generate a second incremented value, the second condition being present in response to a value stored at the second location of the second operand indicating the second operand is a NaN.

* * * * *